Sept. 24, 1957   R. L. MITCHELL   2,807,564
MULTI-COLORED RUBBER MATS AND APPARATUS FOR FORMATION THEREOF
Filed July 2, 1954   3 Sheets-Sheet 1
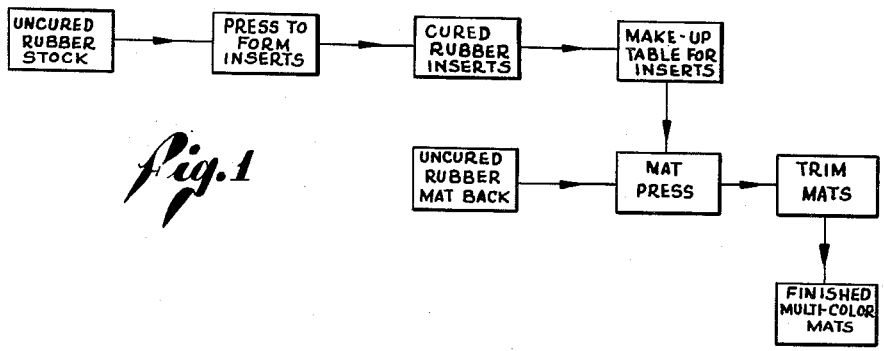
Fig.1
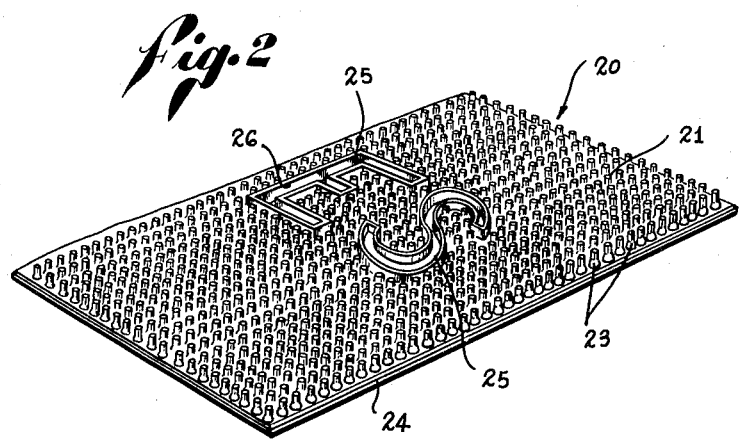
Fig.2
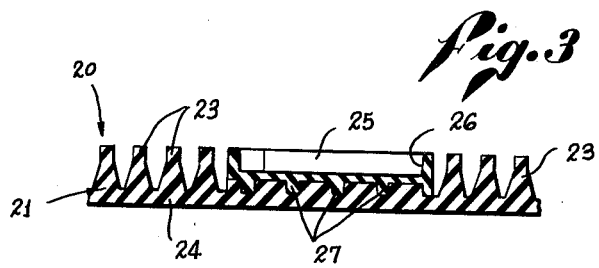
Fig.3
Fig.2A
INVENTOR.
ROBERT L. MITCHELL
BY
Attorneys Sept. 24, 1957  R. L. MITCHELL  2,807,564
MULTI-COLORED RUBBER MATS AND APPARATUS FOR FORMATION THEREOF
Filed July 2, 1954  3 Sheets-Sheet 2
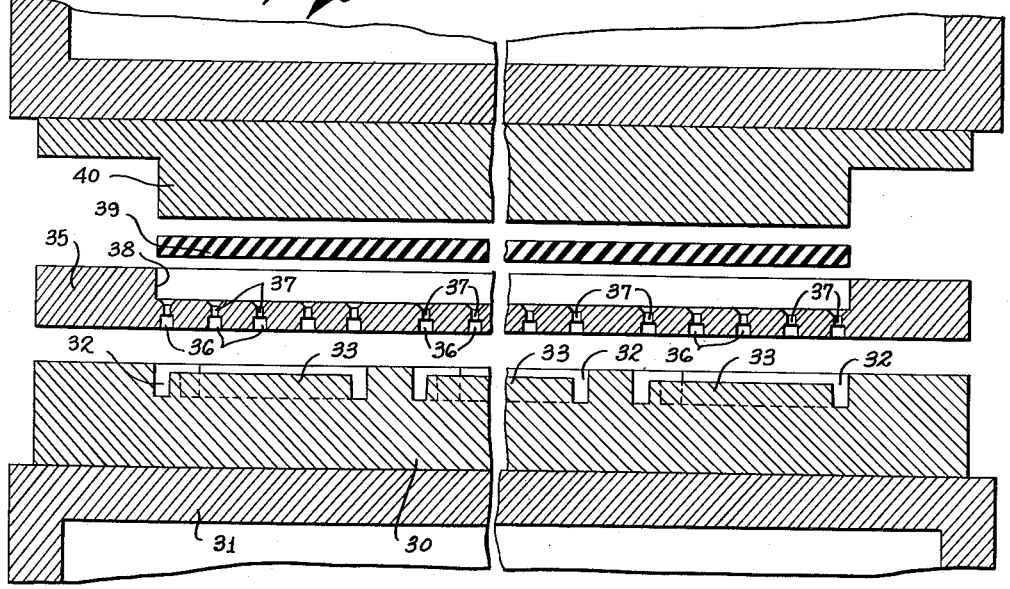
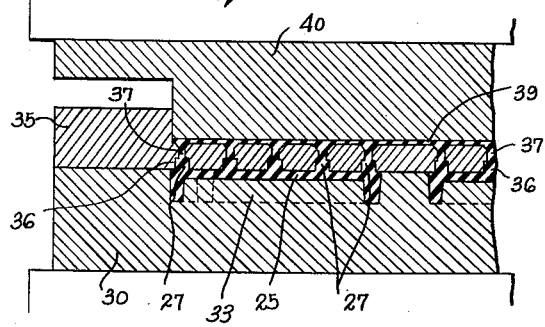
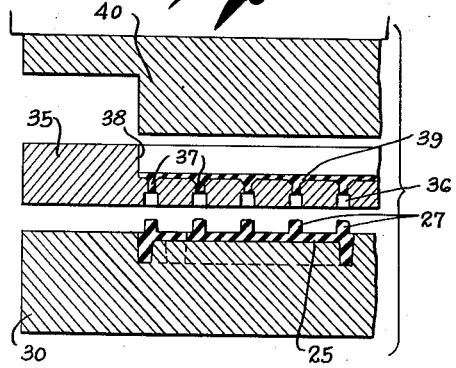
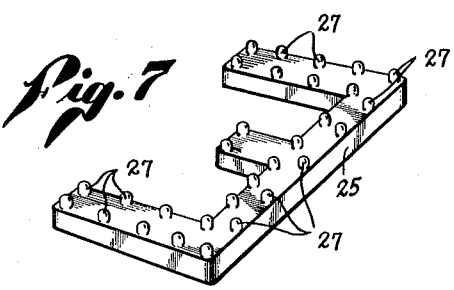
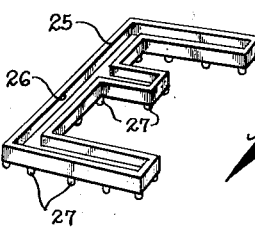
INVENTOR.
ROBERT L. MITCHELL
BY Lulvrider Mattingly & Huntley
Attorneys Sept. 24, 1957            R. L. MITCHELL            2,807,564
MULTI-COLORED RUBBER MATS AND APPARATUS FOR FORMATION THEREOF
Filed July 2, 1954            3 Sheets-Sheet 3
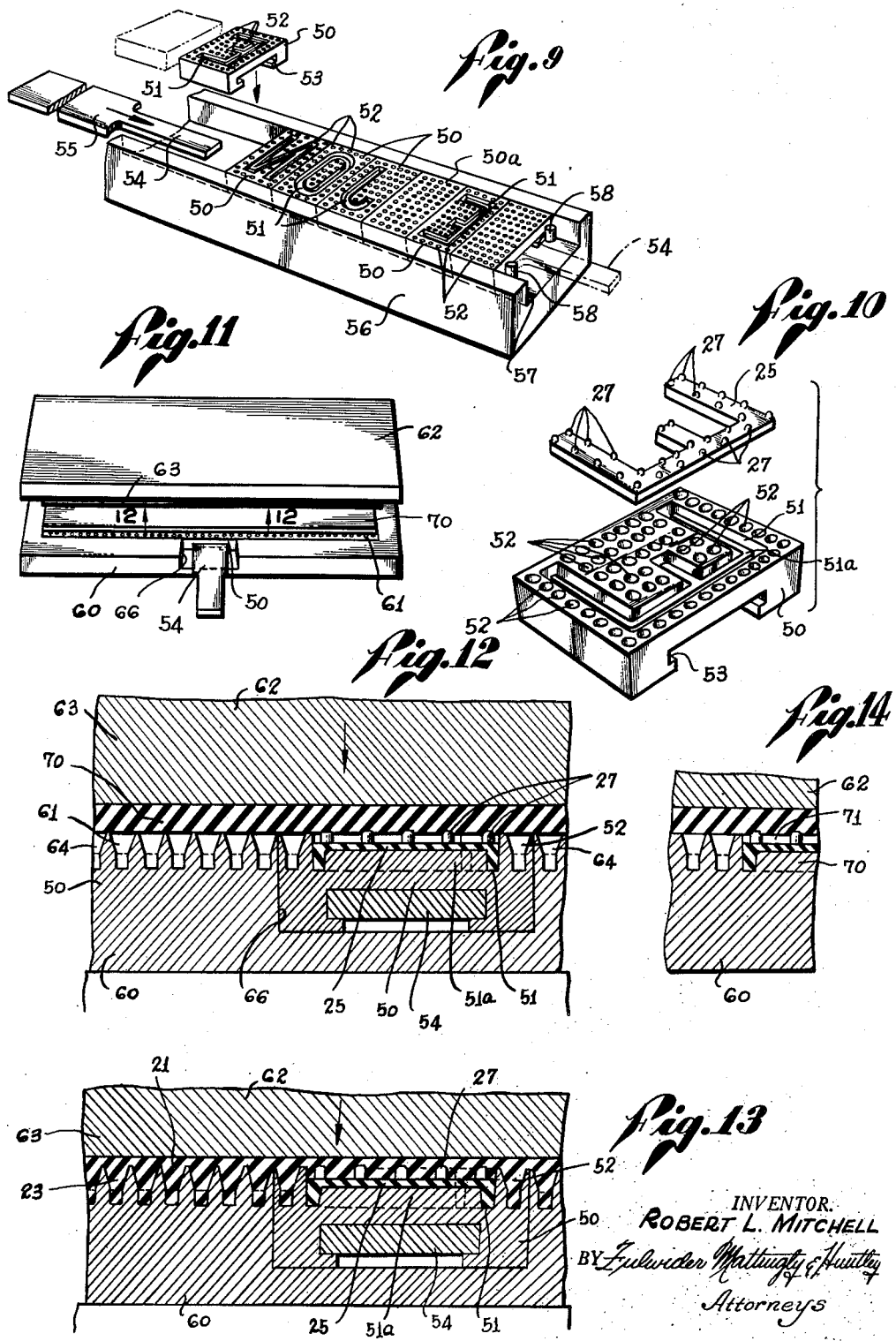
INVENTOR.
ROBERT L. MITCHELL

United States Patent Office 2,807,564
Patented Sept. 24, 1957

2,807,564

MULTI-COLORED RUBBER MATS AND APPARATUS FOR FORMATION THEREOF

Robert L. Mitchell, Los Angeles, Calif.

Application July 2, 1954, Serial No. 440,991

8 Claims. (Cl. 154—49)

My invention relates generally to mats of rubber-like material and more particularly to the formation of multi-colored mats wherein indicia or design portions are inlaid in the body of the mat and formed of a different color material than the main body material.

The formation of floor mats and the like from a single colored rubber material including the impressing of letters, numerals or other outstanding design indicia is a known art. Such mats may be formed economically utilizing compression and transfer molding equipment wherein the mat material is flowed in a mold to achieve a desired shape. However, it has not heretofore been practical to make multi-colored mats in which the indicia in the mat are formed of a different colored material than the main body. The advantages of multi-colored mats from a standpoint of decorative effect and advertising value are apparent, and a practical way of producing such mats has long been sought.

One of the primary problems of producing mats having integrally molded indicia of different colored rubber is to control the flow of material so as to achieve proper alignment and definition of the mating surfaces of different colored material. If the insert portions of the mat are preformed, it is necessary to accurately hold the inserts in place while the material is flowed around the inserts into the mat mold. Any shift in the position of the inserts, particularly if lettering is used, is unsatisfactory, and where the forming pressures on the flowable mat material are high this problem may be acute. If it is attempted to flow materials of different colors into a mold at the same time, achievement of exact boundary definition is almost impossible and the finished mat does not have a good appearance.

Another problem in producing multi-colored mats is due to the fact that it is very difficult to secure a good bond between the parent material and the inserts. Many different proposals for joining semi-cured rubber to cured or uncured rubber have been made, but in no event did a good mechanical bond result. Such mats are therefore subject to separation under wear and deteriorate rapidly.

With the foregoing in mind, it is a major object of this invention to provide a multi-colored mat having a good bond between inserts and parent material, exact placement and alignment of the inserts, and good definition along the boundary lines.

Another object of the invention is to provide a multi-colored mat having inserts formed with outstanding projections or prongs designed for interlocking engagement with the main body of the mat.

An equally important object of the invention is to provide mat molding apparatus having insert holding means designed to hold inserts within a main mold in an accurate non-shiftable position with the inserts so disposed as to be integrally molded into and locked with the parent material of the mat.

It is also an object of the invention to provide insert holding means having interchangeable sections for holding the inserts within the mat mold.

A further object of the invention is to provide holding dies designed to hold inserts within the main mold in such a position as to achieve a proper flow of material within the mat mold to achieve a good insert bond.

Still another object of the invention is to provide a method and apparatus for producing multi-colored mats at a low cost.

These and other objects and advantages of the invention will become apparent from the following detailed description of the preferred form of mat and the apparatus for forming the mat, together with an inspection of the accompanying drawings in which:

Figure 1 is a flow diagram illustrating the steps in the manufacture of the mats;

Figure 2 is a partial perspective view of a finished mat;

Figure 2A is a partial plan view showing a modified form of insert;

Figure 3 is a cross-section taken through the mat of Figure 2;

Figure 4 is a cross-section taken through the press for forming the individual inserts;

Figure 5 is a partial section showing the press of Figure 4 in a closed position;

Figure 6 is a partial section similar to Figure 5 showing the letter press opened after the formation of the insert is completed;

Figure 7 is a rear perspective view of a finished letter insert;

Figure 8 is a front perspective view of the letter shown in Figure 7;

Figure 9 is a perspective view of the make-up table showing an individual holding die being positioned therein;

Figure 10 is a perspective view of a holding die showing a letter about to be inserted therein;

Figure 11 is a partial end perspective of the final mat mold showing the relationship of the sectional holding dies;

Figure 12 is a cross-section of the final mat mold before closing;

Figure 13 is a cross-section of the mold shown in Figure 12 in closed position; and Figure 14 is a partial cross-section of a modified form of mat mold wherein the insert holding dies are formed integrally with the main mold block.

Referring now to the drawings, and particularly to Figures 2 and 3 thereof, a portion of a preferred form of mat 20 is shown to be of flat rectangular shape. Mat 20 may be particularly designed as a door mat, and is formed with a body 21 of rubber-like material having an interrupted upper surface defined by a plurality of small raised wiping fingers 23. The bottom of body 21 is a solid backing layer or sheet 24 formed integrally with fingers 23 and providing a firm foundation therefor. Set within the top surface of body 21 are one or more inserts 25 shown typically arranged to form a greeting or name. Inserts 25 lie flush with the upper ends of fingers 23 and are of a contrasting color to body 21, being also formed of suitable rubber-like material. As can be understood, the design of the mat is subject to considerable modification, both as to the surface of body 21 and the indicia represented by inserts 25.

The preferred steps in the formation of mat 20 are illustrated diagrammatically in Figure 1 and should be noted briefly before considering the construction in detail. The inserts 25 are formed separately of suitable material such as uncured rubber stock, and this may be done conveniently by a molding operation. During this operation, the inserts are heat cured either partially or completely so as to take a permanent and definite shape. As an alternative step, a sheet of material may be cured, and the inserts then cut or stamped therefrom in the desired shape.

After formation, inserts of desired shape and color are fitted into individual holding dies, and the latter are arranged in proper sequence and alignment. The group of insert holding dies is then placed within a mold shaped to form the body of the mat and held in positive and accurate relationship to the edges of the body mold. Suitable rubber stock is forced into the body mold to form the body and this material flows around the inserts to bond them firmly in place. The mat is then heat cured to fix the body material and the mat is removed from the mold and trimmed or otherwise finished. The result is a multi-colored mat of accurate configuration in which the inserts are firmly bonded to the body and are outstanding in appearance because of the color contrast.

As is best seen in Figures 3, 7, and 8, the individual inserts 25 are illustrated as typical block letters and may be formed with a front outlining groove or recesses 26 for improved appearance. The style of lettering may of course be varied, and in some cases, complete words of script lettering may be formed as a unit. Figure 2A shows such an insert 25a in which a group of script letters are formed integrally into a unitary word. On the back of inserts 25 are a plurality of short rearwardly projecting prongs 27 which are formed integrally with the body of the inserts. Prongs 27 engage directly within the surrounding material of the mat and thus provide a strong mechanical bond. As can be appreciated, the increased contact area provided by the prongs 27 and the irregular joinder surfaces of the prongs and surrounding body material provide much greater strength than would a simple butt joint. With this construction it is therefore possible to join cured or semi-cured material to uncured material as has not heretofore been practical.

Figures 4 through 6 show a preferred form of press molding apparatus for forming the inserts 25. As shown, a lower die block 30 is supported on a standard 31 and formed with a plurality of upwardly open cavities 32. Each of cavities 32 is shaped to produce a single insert, and where the inserts are to be letters, an assorted group of different letters may be formed in a single die block. It should be noted that the cavities 32 are shaped to form the inserts face down, an upstanding rib 33 being positioned within the cavities to define the front insert groove 26 if desired.

Mounted above die block 30 is a separable die block 35 which has in the lower face thereof a number of short cylindrical holes 36 positioned above each of the cavities 32 to form the prongs 27. The holes 36 above each of the cavities 32 are arranged to follow the contours of the latter and are so spaced as to form a large number of closely spaced prongs 27. At the top of each of holes 36, in communication therewith, is a sprue opening 37 which leads into an upper shallow chamber 38 that is open to the top of block 35. Chamber 38 is adapted to receive a sheet or blank 39 of raw material with which to form the inserts 25.

At the top of the press is a plunger 40 mounted for vertical reciprocating movement and having a lower force or piston shaped to enter within chamber 38 and exert downward pressure on the blank 39. As is illustrated in Figure 5, the material of blank 39 is caused to flow downwardly through sprue openings 37 to fill holes 36 and cavities 32. Inserts 25 are thus formed and prongs 27 are integrally attached thereon.

While inserts 25 are in cavities 32 heat is applied to the die blocks to cure or partially cure the rubber-like material of the inserts. Any of the conventional and well known heating means used in the art may be employed for this purpose and in and of themselves form no part of my invention. The finished inserts 25 are removed from cavities 32 and have the form shown in Figures 7 and 8. It will be appreciated that the above-described apparatus for forming inserts 25 is preferred, but other means for forming the inserts could be used. For example, a blank having preformed prongs could be produced and the individual inserts then stamped or cut to shape.

After formation the individual inserts are placed face down in holding dies 50 as shown in Figures 9 and 10. Each of the dies 50 has an upper shaped cavity 51 which is adapted to receive the insert 25 in close engagement therewith so that the sides and front edges of the insert are enclosed but the back of the insert is exposed. An upstanding rib 51a may be positioned within cavities 51 to fill insert groove 26 as desired. Closely surrounding the cavity 51 but spaced from immediate communication into the walls thereof are a plurality of recesses 52 so shaped as to form the wiping fingers 23 which form the surface of the mat body. As can be understood, the pattern and arrangement of recesses 52 is modified in each case to provide a portion of the desired pattern on the body of the mat.

Dies 50 are of rectangular block shape and are formed with a recessed and flanged groove or track 53 on the bottom thereof. As shown in Figure 9 a group of dies 50 are adapted to be arranged in side-by-side alignment so as to form any desired wording or symbol. Spacing dies 50a, having no cavity 51, may be inserted between adjacent dies 50 or at the ends of the group to provide for letter spacing in the illustrative example shown. As the dies 50 are so grouped, they are held in aligned position by a locking bar 54 which passes slidably through grooves 53 in interlocking engagement. An enlarged stop shoulder 55 may be formed on bar 54 to limit the movement thereof by engagement against the end die 50.

To facilitate the grouping of dies 50, a make-up table 56 is preferably provided having an elongated channel 57 therein shaped to receive dies 50 and hold them in alignment. Stop pins 58 are provided at one end of channel 57 to abut an end die 50 and hold it against sliding movement. By positioning a group of dies 50 within channel 57 and against stop pins 58, the insertion of locking bar 54 through the dies in the manner indicated is greatly facilitated. Normally the group of dies 50 desired for a particular mat will be assembled in make-up table 56 before the dies are filled with inserts 25. The operator then selects the proper inserts 25 from the group of previously formed inserts to fill the dies 50 as required. It should again be emphasized that the inserts 25 are fitted face down into dies 50 so that the rearwardly projecting prongs 27 are fully exposed.

Figures 11 to 13 show suitable mold apparatus for forming the body of the mat and the cooperative relationship of the inserts and holding dies thereto. As indicated in Figure 11, a lower, generally rectangular mold block 60 has an internal upwardly facing cavity 61 shaped to form the mat body 21. An upper mold block 62 is adapted to close downwardly against block 60 and has a lower force or plunger 63 which fits downwardly into cavity 61. The entire lower surface of cavity 61 is formed with recesses 64 shaped to form the wiping fingers 23 on the top surface of the mat body as is best seen in Figures 12 and 13. The recesses 64 are of course arranged in any desired pattern, and are of the same shape and spacing as the recesses 52 previously described on the top of dies 50.

Extending through mold block 60 is an elongated slot 66 which is of a size and shape to receive the assembled group of insert holding dies 50 as previously made up. The dies 50 are so positioned within block 60 as to lie flush with the bottom surface of cavity 61 so that the recesses 52 and 64 continue in coplanar relationship. The depth of the die block cavity 51 is also determined so that the front surface of inserts 25 will lie flush with the outer ends of fingers 23 when the latter are formed. It is preferable that the total depth of cavity 51 be substantially the same as that of the insert 25 together with the prongs 27. Thus while the prongs 27 are fully open to the interior of cavity 61, they are dropped below the uppermost part of die 50 and protected by the side walls of the latter.

A flat blank or sheet of raw material 70 is placed in cavity 61 in the forming of the mat. Plunger 62 is pressed downwardly against blank 70 by suitable pressing means as indicated in Figures 12 and 13. The material of blank 70 is forced into recesses 52 and 62 to form the wiping fingers 23 on the front surface of the mat body. At the same time the material of blank 70 is forced to flow between and around insert prongs 27 so as to engage firmly therewith. By dropping the prongs 27, as previously mentioned, to a position within die 50 it has been found that a better joinder between the material of blank 25 and prongs 27 is made possible, since the placement of material into the spaces around prongs 27 is not disturbed by subsequent material flow in completing the formation of the mat body.

It should be pointed out, that the insert holding dies need not be formed separately from the main mold body. As is illustrated in Figure 14 an insert holding die portion 70 may be formed integrally with a main body mold 60a. The top surface of die portion 70 has a cavity 71 to receive inserts 25 and hold them flush with the surface of the main mold cavity 61. It will be appreciated, the die portions 70 are otherwise shaped to function in the same manner as insert holding dies 50. Such insert holding dies formed integrally with the main body mold are particularly adapted for making large quantity production of a fixed style of mat at low cost.

After formation the mat body 21 is heat cured in molds 60 and 62 so as to take a permanent shape. Upon removal from the mold apparatus the completed mat thus has the appearance shown in Figure 2, and comprises a body of one colored material and inserts of a contrasting color. Because of the engagement between prongs 27 and the body material, the inserts 25 are firmly positioned and are adapted to withstand hard wear.

While I have thus shown and described the mat and its formation in considerable detail, it will be understood that modifications can be made without departing from the scope of the invention. Therefore, I do not wish to be restricted except as defined in the appended claims.

I claim:

1. In a mat construction: a body of resilient deformable abrasion resistant material having a front interrupted patterned surface joined integrally with a solid backing layer; and an insert of resilient deformable abrasion resistant material imbedded in the said body flush with the front surface thereof and surrounded by the unbroken pattern of said front surface, said insert having rearwardly facing prongs molded in said backing layer to retain said insert therein.

2. In a mat construction: a body of resilient deformable abrasion resistant material having a front interrupted patterned surface joined integrally with a solid backing layer; and an insert of resilient deformable abrasion resistant material imbedded in said body flush with the front surface thereof and surrounded by the unbroken pattern of said front surface, said insert having a front portion of a depth less than the depth of the front surface portion of said body and a plurality of rearwardly facing prongs thereon extending to said backing layer and molded therein to retain said insert firmly in said body.

3. The method of manufacturing multi-colored mats of resilient deformable abrasion resistant material which includes the steps of: forming individual inserts of colored resilient deformable abrasion resistant material with rearwardly projecting prongs thereon; holding said inserts rigidly against lateral movement in a mat body mold with the front surface of said inserts flush with the front forming surface of said body mold and the rear surface upwardly exposed with said prongs projecting freely into the cavity of said mold; and filling said body mold under pressure with resilient deformable abrasion resistant material of a different color and in a flowable state, said material flowing around and over said projecting prongs to bond said insert to said body.

4. The method of manufacturing multi-colored mats of resilient deformable abrasion resistant material which includes the steps of: forming individual inserts of colored resilient deformable abrasion resistant material with rearwardly projecting prongs thereon; placing said inserts in holding dies having a front patterned surface corresponding to the pattern of a mat body mold and edges surrounding an insert cavity and confining said insert against lateral movement and holding said dies flush with the front forming surface of said body mold with the rear surface of said inserts exposed and said prongs projecting freely into the cavity of said mold; and filling said body mold under pressure with resilient deformable abrasion resistant material of a different color and in a flowable state, said material flowing around and over said projecting prongs to bond said insert to said body and into said die to continue the pattern of the body into close proximity to said inserts.

5. Apparatus for forming multi-colored mats of resilient deformable abrasion resistant material having inserts therein, which includes: a body mold having a front forming patterned surface on the bottom thereof with a recessed bottom slot therein; and an insert holding die fitted within said bottom slot and held rigidly within said body mold, said die being formed with a patterned upper surface coplanar with the bottom surface of said mold and continuing the pattern thereof and surrounding a top opening to expose the rear surface of said insert for bonding engagement with the rear portion of the mat.

6. Apparatus for forming multi-colored mats of resilient deformable abrasion resistant material having inserts therein; which includes: a body mold having a front forming patterned interrupted surface on the bottom thereof with a recessed bottom slot therein; and an insert holding die fitted within said bottom slot and held rigidly within said mold, said die being formed with a patterned upper surface positioned flush with the bottom surface of said mold and continuing the pattern thereof, and said die having an upwardly open cavity therein shaped to fit said insert to hold said insert for bonding engagement with the rear portion of said mat when said body mold is filled.

7. Apparatus for forming multi-colored mats of resilient deformable abrasion resistant material having inserts therein, which includes: a body mold having a front forming surface on the bottom thereof with an elongated recessed slot therein; a plurality of interchangeable insert holding dies adapted to be fitted slidably within said bottom slot, said dies being positioned flush with bottom surfaces of said mold, and each of said dies having an upwardly open cavity therein shaped to hold one of said inserts for bonding said inserts to the rear portion of the mat when said mold is filled, the bottom of each of said dies having a flanged track therein extended in the direction of said slot; and a locking bar extended through all of said tracks to hold said dies against movement.

8. Apparatus for forming multi-colored mats of resilient deformable abrasion resistant material having inserts therein, which includes: a body mold having a front forming patterned interrupted surface on the bottom thereof with an elongated recessed bottom slot therein; a plurality of interchangeable insert holding dies adapted to be fitted slidably within said bottom slot, said dies being formed with a patterned upper surface positioned flush with the bottom surface of said mold and continuing the pattern thereof and each of said dies having an upwardly open cavity therein shaped to tightly hold one of said inserts therein for bonding said insert with the rear portion of said mat when said body mold is filled, the bottoms of each of said dies having a flanged track therein; and a locking bar extended through all of said tracks to hold said dies against movement.

References Cited in the file of this patent

UNITED STATES PATENTS

| | | |
|---|---|---|
| 806,472 | Jeffrey | Dec. 5, 1905 |
| 1,530,025 | Wilson | Mar. 17, 1925 |
| 1,562,291 | Case | Nov. 17, 1925 |
| 1,846,450 | Packard | Feb. 23, 1932 |
| 1,877,298 | Goodwin | Sept. 13, 1932 |
| 2,340,392 | Lefcourt | Feb. 1, 1944 |
| 2,663,910 | Danielson et al. | Dec. 29, 1953 |

FOREIGN PATENTS

| | | |
|---|---|---|
| 421,902 | Great Britain | Jan. 2, 1935 |